United States Patent
Nishibe et al.

(10) Patent No.: US 8,847,978 B2
(45) Date of Patent: Sep. 30, 2014

(54) INFORMATION PROCESSING APPARATUS, INFORMATION PROCESSING METHOD, AND INFORMATION PROCESSING PROGRAM

(75) Inventors: Mitsuru Nishibe, Tokyo (JP); Kenji Hisanaga, Tokyo (JP)

(73) Assignee: Sony Corporation, Tokyo (JP)

( * ) Notice: Subject to any disclaimer, the term of this patent is extended or adjusted under 35 U.S.C. 154(b) by 576 days.

(21) Appl. No.: 12/888,028

(22) Filed: Sep. 22, 2010

(65) Prior Publication Data
US 2011/0080430 A1     Apr. 7, 2011

(30) Foreign Application Priority Data
Oct. 2, 2009 (JP) ............................... P2009-230745

(51) Int. Cl.
G09G 5/00 (2006.01)
G06F 3/0488 (2013.01)
(52) U.S. Cl.
CPC ................................. G06F 3/04883 (2013.01)
USPC ........................... 345/619; 345/660; 345/672
(58) Field of Classification Search
USPC ................................ 345/173, 661; 455/556.1
See application file for complete search history.

(56) References Cited

U.S. PATENT DOCUMENTS

| | | | |
|---|---|---|---|
| 2008/0268901 A1* | 10/2008 | Miramontes | 455/556.1 |
| 2008/0309632 A1* | 12/2008 | Westerman et al. | 345/173 |
| 2009/0146968 A1 | 6/2009 | Narita et al. | |
| 2010/0097322 A1* | 4/2010 | Hu et al. | 345/173 |
| 2010/0141684 A1* | 6/2010 | Machida | 345/661 |
| 2010/0275150 A1* | 10/2010 | Chiba et al. | 715/784 |
| 2011/0035700 A1* | 2/2011 | Meaney et al. | 715/784 |

FOREIGN PATENT DOCUMENTS

| | | |
|---|---|---|
| JP | 2008-299474 | 12/2008 |
| JP | 2009-140368 | 6/2009 |

* cited by examiner

*Primary Examiner* — Phi Hoang
(74) *Attorney, Agent, or Firm* — Sherr & Jiang, PLLC

(57) ABSTRACT

An apparatus for controlling a display screen including a touch-sensitive panel generating position signals representing a set of positions of a single continuous touch activation between a first time and a second time; and a processor coupled to the panel. The processor configured to: process the signals to detect first and second characteristics of the set; and generate output signals causing a display screen to initiate first and second operations corresponding to the first and second characteristics.

19 Claims, 7 Drawing Sheets

INFORMATION PROCESSING APPARATUS, INFORMATION PROCESSING METHOD, AND INFORMATION PROCESSING PROGRAM

CROSS-REFERENCE TO RELATED APPLICATION

The present application contains subject matter related to that disclosed in Japanese Priority Patent Application JP 2009-230745 filed in the Japan Patent Office on Oct. 2, 2009, the entire content of which is hereby incorporated by reference.

BACKGROUND

1. Technological Field

The present invention relates to an information processing apparatus, an information processing method, and an information processing program. Embodiments of the present invention are suitably applied to an information processing apparatus that executes processing in response to an operation input made on a touch screen, for example.

2. Description of the Related Art

Hitherto, an information processing apparatus including a touch screen has been used widely. In that type of information processing apparatus, more intuitive input operations are realized by making inputs on the touch screen with operations such as tapping, dragging, and flicking. The term "dragging" implies an operation of moving, e.g., a finger while the finger is kept touched on the touch screen, and the term "flicking" implies an operation of flicking, e.g., a finger on the surface of the touch screen.

As one example, an information processing apparatus is proposed in which an image is scrolled when the dragging is performed on the touch screen.

As another example, an information processing apparatus is proposed in which an image is scaled up and down respectively when pinching-out and pinching-in are performed on the touch screen (see, e.g., Japanese Unexamined Patent Application Publication No. 2008-299474 (pages 24, 25 and 34)). The term "pinching-out" implies an operation of touching two fingers onto the touch panel and widening a space between the two fingers, and the term "pinching-in" implies an operation of touching two fingers onto the touch panel and narrowing a space between the two fingers.

Thus, in those proposed information processing apparatuses, when a gesture operation corresponding to a predetermined type of processing (e.g., scrolling of an image) is recognized from an operation input made on the touch screen, the predetermined type of processing is executed.

In the information processing apparatuses described above, however, only one type of processing is executed with one operation input because the operation input and the gesture operation are correlated in one-to-one relation, for example, such that the dragging is recognized as the gesture operation corresponding to the scrolling. The expression "one operation input" used herein represents an input provided by operating gestures of touching the finger onto the touch screen and then releasing the finger from the touch screen.

In view of the above-identified problems, it is desirable to propose an information processing apparatus, an information processing method, and an information processing program, which can realize a more versatile operating system.

SUMMARY

Consistent with one embodiment, an apparatus for controlling a display screen is disclosed. The apparatus may include a touch-sensitive panel generating position signals representing a set of positions of a single continuous touch activation between a first time and a second time. The apparatus may further include a processor coupled to the panel, the processor configured to process the signals to detect first and second characteristics of the set and generate output signals causing a display screen to initiate first and second operations corresponding to the first and second characteristics.

DETAILED DESCRIPTION

Embodiments of the present invention will be described below. The description is made in the following sequence:
1. Embodiment
2. Other embodiments

1. Embodiment

1-1. Gist of Embodiment

The gist of the embodiment is first described. After describing the gist, details of the embodiment will be described.

Figure 1:
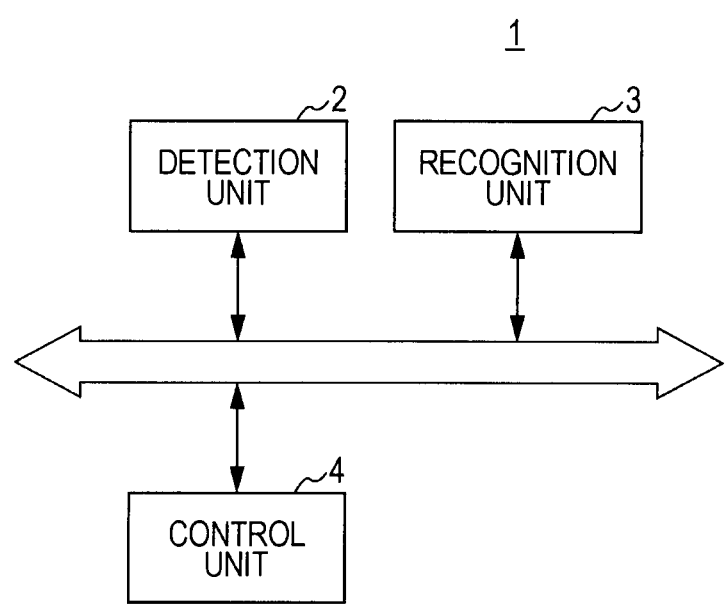
FIG. 1 is a functional block diagram of an information processing apparatus representing the gist of an embodiment.

In FIG. 1, reference numeral 1 denotes an information processing apparatus. The information processing apparatus 1 includes a detection unit 2 for detecting an amount of motion (movement) (i.e., a first characteristic of the operation input) of an operation input made on a display screen and an extent of curvature (curving) (i.e., a second characteristic of the operation input) of the motion per predetermined time. The information processing apparatus 1 further includes a recognition unit 3 for recognizing, based on the amount of motion, whether a gesture operation corresponding to scrolling of an image displayed on the display screen (i.e., a first operation) has been performed, and for recognizing, based on the extent of curvature, whether a gesture operation corresponding to scaling-up or -down of the image (i.e., a second operation) has been performed.

In addition, the information processing apparatus 1 includes a control unit 4 for executing both the scrolling of the image and the scaling-up or -down of the image when the recognition unit 3 recognizes that the gesture operation corresponding to the scrolling of the image and the gesture operation corresponding to the scaling-up or -down of the image have been performed.

With the configuration described above, the information processing apparatus 1 can execute plural types of processing, such as the scrolling of the image and the scaling-up or -down of the image, in response to one operation input.

A concrete example of the information processing apparatus 1 having the above-described configuration will be described in detail below.

1-2. External Appearance of Portable Terminal

Figure 2:
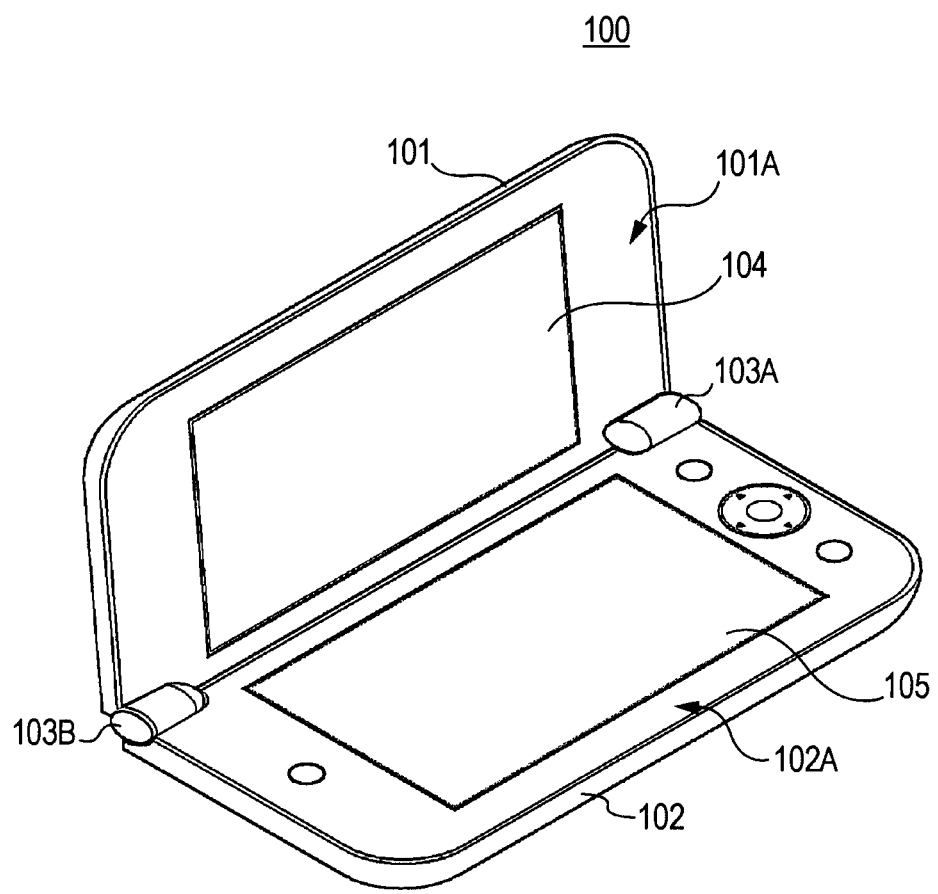
FIG. 2 illustrates an external appearance of a portable terminal according to the embodiment.

An external appearance of a portable terminal 100 as the concrete example of the information processing apparatus 1 is now described with reference to FIG. 2.

In the portable terminal 100, a first casing 101 and a second casing 102 are coupled by coupling members 103A and 103B in the form of hinges, for example, to be rotatable in a direction moving away from each other or in a direction coming closer to each other. Further, the first casing 101 and the second casing 102 are electrically connected to each other.

The first casing 101 and the second casing 102 are each substantially in a flat rectangular shape having such a size as graspable by one hand.

A first touch screen (i.e., a touch-sensitive panel) 104 having a rectangular shape is disposed at a center of a front surface 101A of the first casing 101. A second touch screen (i.e., a touch-sensitive panel) 105 having a shape and a size similar to those of the first touch screen 104 is disposed at a center of a front surface 102A of the second casing 102.

The first touch screen 104 and the second touch screen 105 are each a display device adaptable for a touch operation (i.e., a touch activation) with a user's finger (or a pen). The portable terminal 100 is utilized by a user in such a state, for example, that the first touch screen 104 serves as an upper screen and the second touch screen 105 serves as a lower screen.

Various hardware buttons are disposed on both sides of the second touch screen 105.

1-3. Hardware Configuration of Portable Terminal

Figure 3:
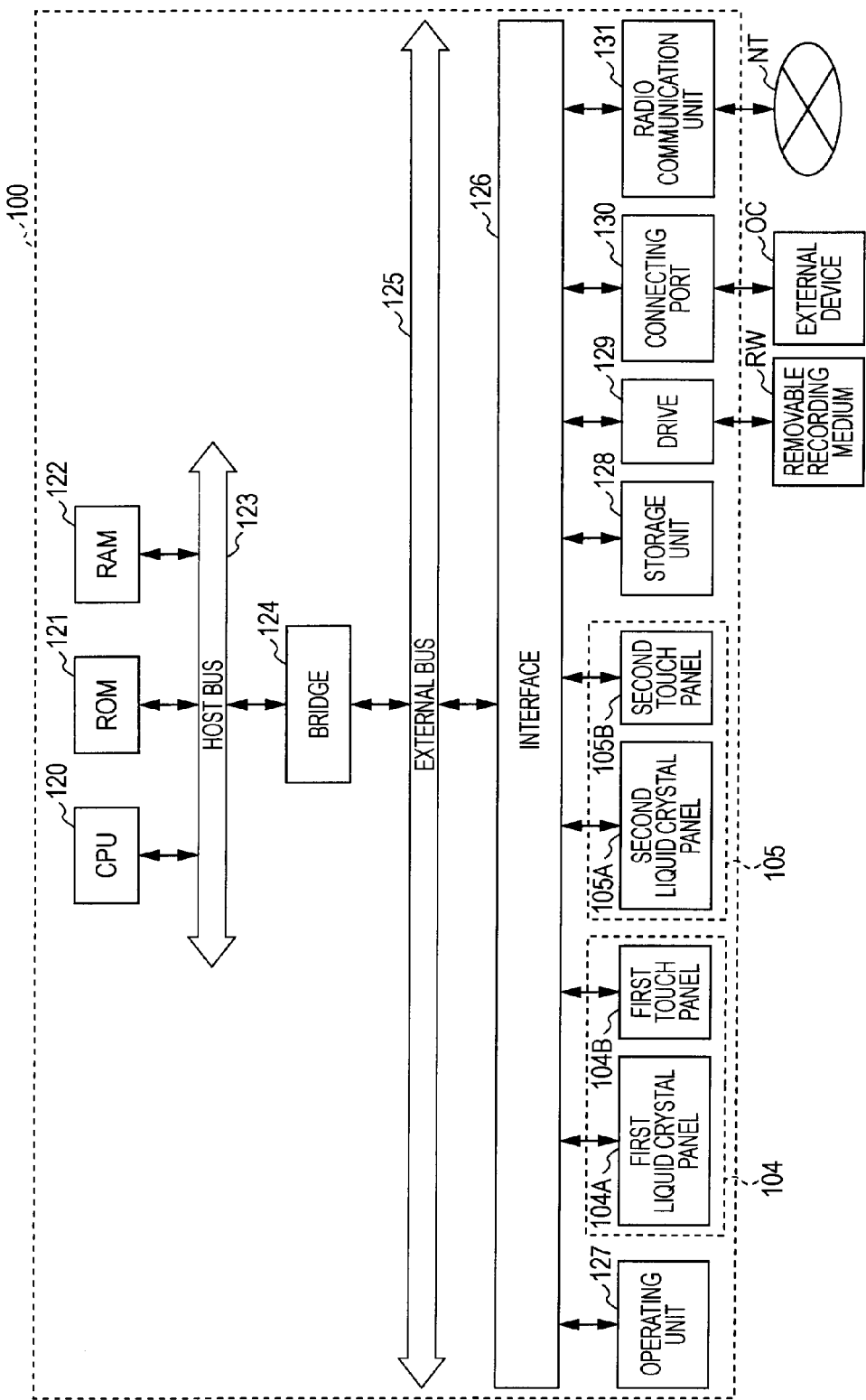
FIG. 3 is a block diagram illustrating a hardware configuration of the portable terminal according to the embodiment.

A hardware configuration of the portable terminal 100 is now described with reference to FIG. 3. In the portable terminal 100, a CPU 120, a ROM 121, and a RAM 122 are interconnected via a host bus 123. "CPU" is an acronym of Central Processing Unit. "ROM" is an acronym of Read Only Memory. "RAM" is an acronym of Random Access Memory.

In the portable terminal 100, various processes are executed by the CPU 120, which loads various programs written in the ROM 121, etc. into the RAM 122 and which executes those programs.

The host bus 123 is connected to an external bus 125 via a bridge 124. Further, the external bus 125 is connected to an operating unit 127, a first liquid crystal panel 104A, a first touch panel 104B, a second liquid crystal panel 105A, and a second touch panel 105B via an interface 126. In addition, the external bus 125 is connected to a storage unit 128, a drive 129, a connecting port 130, and a radio communication unit 131 via the interface 126.

The CPU 120 controls the various units in accordance with input signals which have been successively sent from the first touch panel 104B, the second touch panel 105B, and the operating unit 127 via the interface 126, the external bus 125, and the host bus 123.

The first touch panel 104B is a device constituting the first touch screen 104 in cooperation with the first liquid crystal panel 104A. Also, the second touch panel 105B is a device constituting the second touch screen 105 in cooperation with the second liquid crystal panel 105A.

When an arbitrary position on the first touch panel 104B is touched by the finger, the first touch panel 104B detects the coordinates of the position where the first touch panel 104B is touched (i.e., the touch position), and then sends an input signal (i.e., position signal) representing the coordinates of the touch position to the CPU 120.

Upon deriving the coordinates of the touch position from the input signal sent from the first touch panel 104B, the CPU 120 converts the obtained coordinates to coordinates on a screen of the first liquid crystal panel 104A, thereby recognizing which position is touched on the screen of the first liquid crystal panel 104A.

Further, the CPU 120 successively converts the coordinates of the touch positions derived from each of the input signals sent per certain time to coordinates on the screen of the first liquid crystal panel 104A (i.e., a set of positions of a single continuous touch activation between a first time and a second time), thereby recognizing how the touch position has been moved (i.e., a locus of the touch position).

On the basis of the touch position and the locus thereof which have been recognized as described above, the CPU 120 determines what touch operation has been made at which position on the screen of the first liquid crystal panel 104A.

Similarly, the second touch panel 105B sends, to the CPU 120, an input signal representing the coordinates of the detected touch position. The CPU 120 determines, from the input signal, what touch operation has been made at which position on the screen of the second liquid crystal panel 105A.

The operating unit 127 is a device including various hardware buttons and so on. The operating unit 127 sends, to the CPU 120, input signals corresponding to operations of those hardware buttons. On the basis of the input signal sent from the operating unit 127, the CPU 120 determines which one of the hardware buttons has been operated.

The CPU 120 is connected to a nearby external device OC via a connecting port 130 in a manner of device-to-device connection for direct communication with the external device OC.

Further, the CPU 120 is connected to the Internet NT by the radio communication unit 131 via an access point for communication with a server and other devices on the Internet NT.

When the CPU 120 obtains, e.g., contents data (such as dynamic image data and music data) as a result of communicating with other devices via the connecting port 130 or the radio communication unit 131 in accordance with user's operations, for example, the CPU 120 stores the obtained data in the storage unit 128. In addition, when a removable recording medium RW (such as an optical disk or a flash memory) is inserted in the drive 129, the CPU 120 stores the contents data in the removable recording medium RW in accordance with user's operations.

1-4. Web Browser Screen

The portable terminal 100 has the Web browser function for browsing Web pages provided by servers on the Internet. A Web browser screen provided by the Web browser function and input operations made on the Web browser screen will be described below.

With execution of a Web browser program, the CPU 120 communicates with any server on the Internet via the radio communication unit 131 and obtains data of a Web page from the relevant server. Further, the CPU 120 displays, on the first touch screen 104, for example, a Web browser screen for displaying a Web page image based on the obtained data of the Web page.

On the Web browser screen, the whole or a part of the Web page image is displayed depending on the size of the Web page image. Additionally, when the CPU 120 initially displays the Web browser screen by executing the Web browser program, the CPU 120 sets a scaling factor of the Web page image to a reference value (i.e., ×1), for example.

When dragging or flicking is performed on the first touch screen 104, the CPU 120 recognizes that a gesture operation corresponding to scrolling of the Web page image (referred to also as a "scroll operation") has been performed. Then, the CPU 120 scrolls the Web page image in response to the scroll operation.

Figure 4:
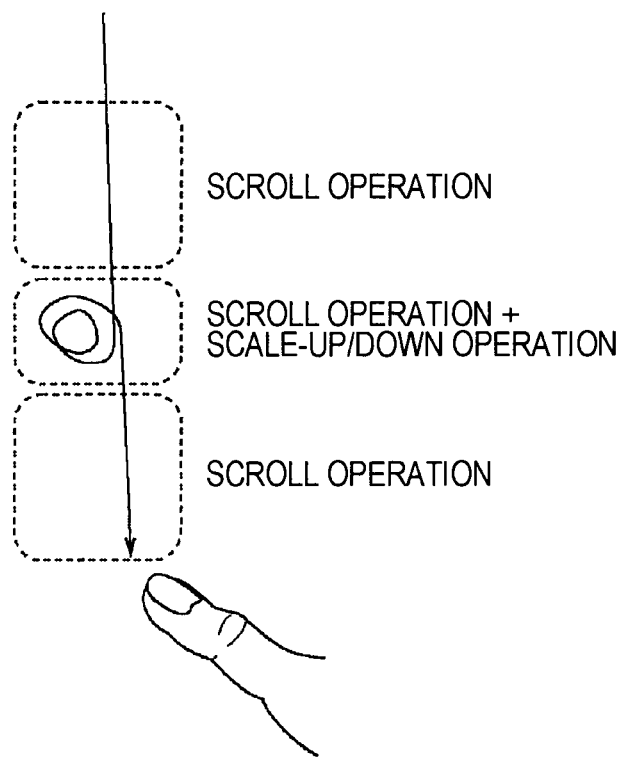
FIG. 4 is an illustration to explain a scroll operation and a scale-up/down operation.

Further, as illustrated in FIG. 4, when the CPU 120 recognizes that, during the dragging on the first touch screen 104, the finger is moved while drawing one or more circles, the CPU 120 recognizes that such a motion represents, along with the scroll operation, a gesture operation corresponding to scaling-up or -down of the Web page image. The gesture operation corresponding to the scaling-up of the Web page image is called a "scale-up operation", and the gesture operation corresponding to the scaling-down of the Web page image is called a "scale-down operation". Further, the scale-up operation and the scale-down operation are collectively called a "scale-up/down operation".

In the above case, the CPU 120 not only scrolls the Web page image in response to the scroll operation, but also scales up or down the Web page image in response to the scale-up/down operation. More specifically, when the finger draws a circle clockwise, for example, the CPU 120 recognizes that the scale-up operation has been performed, and then scales up the Web page image with a center set to the position currently touched by the finger. On the other hand, when the finger draws a circle counterclockwise, for example, the CPU 120 recognizes that the scale-down operation has been performed, and then scales down the Web page image with a center set to the position currently touched by the finger.

A process of recognizing the gesture operation, such as the scroll operation and the scale-up/down operation, performed on the first touch screen 104 in the portable terminal 100 will be described in detail below.

When the touch operation by one finger is performed on the first touch screen 104, the CPU 120 derives the coordinates of the touch position on the screen from an input signal sent from the first touch screen 104 per certain time (e.g., several msec).

On the basis of the screen coordinates of the touch position per certain time, the CPU 120 detects an amount of motion of the touch position per certain time. Upon recognizing that the amount of motion of the touch position per certain time is not less than a predetermined value, the CPU 120 recognizes that such a motion represents the dragging or the flicking made on the first touch screen 104, and that the scroll operation has been performed. Incidentally, the CPU 120 determines, based on a motion speed of the touch position, etc., which one of the dragging and the flicking has been made. Then, the CPU 120 scrolls the Web page image in accordance with, e.g., the amount, the direction and the speed of motion of the touch position per predetermined time.

Further, on the basis of the screen coordinates of the touch position per certain time, the CPU 120 detects an extent of curvature of the locus along which the touch position is moved (referred to also as an "extent of motion curvature") per certain time. The CPU 120 recognizes the scale-up/down operation based on the extent of motion curvature.

Figure 5:
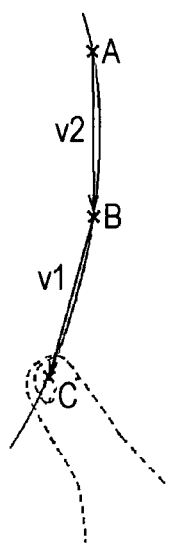
FIG. 5 is an illustration to explain detection of a motion vector.

More specifically, it is assumed that as illustrated in FIG. 5, by way of example, the CPU 120 derives three screen coordinates A, B and C of the touch position in sequence from the input signals which have been successively sent from the first touch screen 104 per certain time. If the screen coordinate C is obtained currently (i.e., at this time), the screen coordinate B has been obtained at the last time, and the screen coordinate A has been obtained before last.

In that case, the CPU 120 detects a motion vector v1 starting from the screen coordinate B and ending at the screen coordinate C based on both the screen coordinate C obtained currently and the screen coordinate B obtained at the last time. The motion vector v1 represents the amount and the direction of motion of the touch position from the last time to the current time.

Further, the CPU 120 detects a motion vector v2 starting from the screen coordinate A and ending at the screen coordinate B based on both the screen coordinate B obtained at the last time and the screen coordinate A obtained before last. The motion vector v2 represents the amount and the direction of motion of the touch position from the time before last to the last time.

By using those two motion vectors v1 and v2 obtained as described above, the CPU 120 calculates a change in the direction of motion of the touch position per certain time (referred to also as a "motion direction change") f(v1,v2) with the following formula (1):

$$f(v1, v2) = \frac{|v1 \times v2|}{|v1| \cdot |v2|} \tag{1}$$

In the case of |v1|=0 or |v2|=0, the CPU 120 calculates f(v1,v2)=0.

Further, the motion direction change f(v1,v2) takes, e.g., a positive value when the motion direction of the touch position is changed clockwise, and it takes, e.g., a negative value when the motion direction of the touch position is changed counterclockwise.

By using the motion direction change f(v1,v2), the CPU 120 calculates an extent R(n) of motion curvature per certain time with the following formula (2):

$$R(n)=R(n-1)\times\alpha+f(v1,v2)\times(1-\alpha) \tag{2}$$

R(n−1) represents the preceding extent of motion curvature. The CPU 120 calculates the extent R(n) of motion curvature whenever the screen coordinate of the touch position is derived from the input signal sent from the first touch screen 104. Accordingly, the term "preceding extent of motion curvature" implies a value of the extent of motion curvature calculated when the screen coordinate of the touch position has been obtained at the last time.

Further, α and (1−α) represent weight coefficients for applying weights to R(n−1) and f(v1,v2), respectively. Thus, in the portable terminal 100, the current extent R(n) of motion curvature is calculated in consideration of the preceding extent R(n−1) of motion curvature. In the portable terminal 100, therefore, as the dragging is continued while drawing a circle, an absolute value of the extent R(n) of motion curvature increases.

Figure 6:
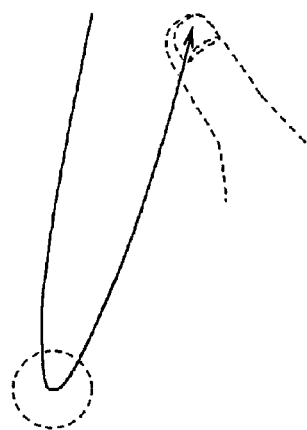
FIG. 6 is an illustration to explain a turn-back motion in the dragging.

When the motion direction of the finger is abruptly turned back at some point in time during the dragging as illustrated in FIG. 6, an absolute value of the motion direction change f(v1,v2) is abruptly increased at that point in time. In the portable terminal 100, however, since the current extent R(n) of motion curvature is calculated in consideration of the preceding extent R(n−1) of motion curvature along with the motion direction change f(v1,v2), the absolute value of the extent R(n) of motion curvature is not abruptly increased even in the above-described case.

For that reason, in the portable terminal 100, the absolute value of the extent R(n) of motion curvature is larger when the dragging is continued while drawing a circle than when the dragging is abruptly turned back. As a result, the portable terminal 100 can discriminate, based on the absolute value of the current extent R(n) of motion curvature, the case where the dragging is continued while drawing a circle and the case where the dragging is abruptly turned back.

Herein, the motion direction change f(v1,v2) takes a positive value when the touch position is moved clockwise, and takes a negative value when the touch position is moved counterclockwise. Therefore, when the extent R(n) of motion curvature takes a positive value, this implies that the touch position is moved clockwise, and when the extent R(n) of motion curvature takes a negative value, this implies that the touch position is moved counterclockwise.

In view of the above-described points, when the extent R(n) of motion curvature takes a positive value, the CPU 120 determines whether the extent R(n) of motion curvature is not less than a predetermined positive value (referred to as a "scale-up start value"). If the CPU 120 determines that the extent R(n) of motion curvature is not less than the scale-up start value, the CPU 120 recognizes that the scale-up operation has been started.

On the other hand, when the extent R(n) of motion curvature takes a negative value, the CPU 120 determines whether the extent R(n) of motion curvature is not more than a predetermined negative value (referred to as a "scale-down start value"). If the CPU 120 determines that the extent R(n) of motion curvature is not more than the scale-down start value, the CPU 120 recognizes that the scale-down operation has been started.

The scale-up start value and the scale-down start value are set to have such absolute values that the scale-up/down operation is not recognized when the dragging is abruptly turned back, and that the scale-up/down operation is recognized only when the dragging is continued while drawing a circle.

When the CPU 120 recognizes, based on the extent R(n) of motion curvature, that the scale-up/down operation has been started, the CPU 120 calculates a change rate ΔS of the scaling factor of the Web page image (referred to also as a "scaling factor change rate") with the following formula (3) by using the extent R(n) of motion curvature:

$$\Delta S = \beta \times R(n) \quad (3)$$

In the formula (3), β is a coefficient for converting the extent R(n) of motion curvature to the scaling factor change rate ΔS. The scaling factor change rate ΔS takes a positive value if the extent R(n) of motion curvature is a positive value, and takes a negative value if the extent R(n) of motion curvature is a negative value.

After calculating the scaling factor change rate ΔS in such a manner, the CPU 120 sets, as a new scaling factor, a value resulting from adding the scaling factor change rate ΔS to the current scaling factor of the Web page image, and then displays the Web page image in accordance with the new scaling factor. As a result, the Web page image displayed on the Web browser screen is scaled up or down.

In the portable terminal 100, as seen from the formula (3), the scaling factor change rate ΔS increases with the extent R(n) of motion curvature taking a larger value. Accordingly, in the portable terminal 100, the change rate of the scale-up factor or the scale-down factor of the Web page image increases as the dragging motion speed (i.e., the circle drawing speed) is relatively higher when the dragging is continued while drawing a circle.

Thus, in the portable terminal 100, the change rate of the scale-up factor or the scale-down factor of the Web page image can be increased with the user quickly drawing a circle by the finger, and the change rate of the scale-up factor or the scale-down factor can be reduced with the user slowly drawing a circle by the finger.

When the extent R(n) of motion curvature is less than the scale-up start value or more than the scale-down start value and hence the CPU 120 recognizes only the scroll operation without recognizing the start of the scale-up/down operation, the CPU 120 executes only the scrolling of the Web page image.

While the finger is kept touched on the first touch screen 104, the CPU 120 continues to obtain the screen coordinate of the touch position per certain time and to detect the amount of motion of the touch position and the extent R(n) of motion curvature per certain time. Further, the CPU 120 scrolls the Web page image in accordance with the amount of motion of the touch position and, at the same time, scales up or down the Web page image in accordance with the extent R(n) of motion curvature.

Figure 7:
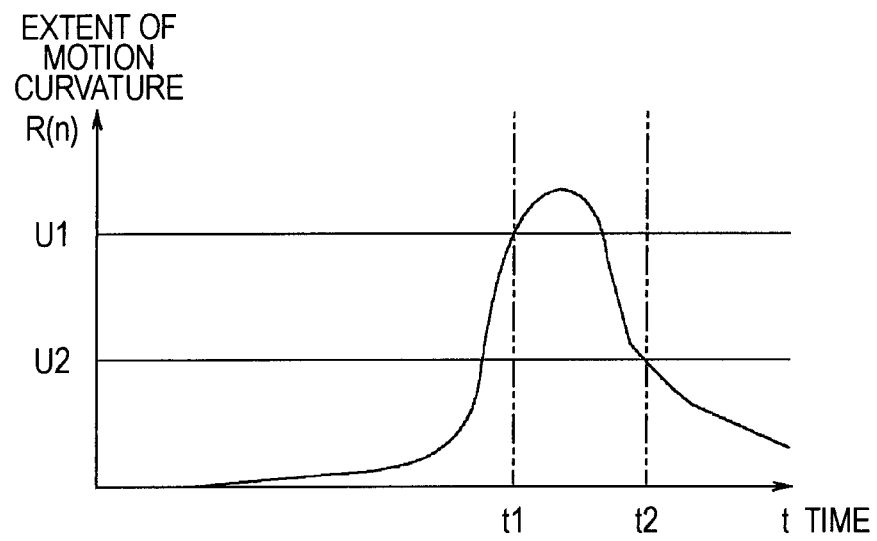
FIG. 7 is a graph to explain an example of change in an extent of motion curvature.

FIG. 7 is a graph illustrating one example of change in the extent R(n) of motion curvature per certain time. In the graph of FIG. 7, a vertical axis represents the extent R(n) of motion curvature, and a horizontal axis represents time.

As seen from the graph of FIG. 7, the extent R(n) of motion curvature is not less than the scale-up start value U1 at a time t1. Accordingly, the CPU 120 recognizes that the scale-up operation has been started at the time t1. Then, the CPU 120 changes the scaling factor of the Web page image in accordance with the extent R(n) of motion curvature as described above, thereby scaling up the Web page image.

After recognizing that the scale-up operation has been started, the CPU 120 continues to change the scaling factor of the Web page image in accordance with the extent R(n) of motion curvature until the extent R(n) of motion curvature becomes less than a predetermined positive value (referred to also as a "scale-up end value") U2.

In the portable terminal 100, therefore, the Web page image is continuously scaled up while the finger is continuously moved in a way of drawing a circle clockwise on the first touch screen 104.

The scale-up end value U2 is set to be smaller than the scale-up start value U1. Accordingly, in the portable terminal 100, once the scale-up operation is recognized, a smaller value of the extent R(n) of motion curvature is also recognized as representing the scale-up operation in comparison with the state before the recognition of the scale-up operation.

When the extent R(n) of motion curvature becomes less than the scale-up end value U2 (i.e., after a time t2 in FIG. 7), the CPU 120 recognizes that the scale-up operation has been ended. Then, the CPU 120 stops changing of the scaling factor of the Web page image and holds the scaling factor of the Web page image constant. In the portable terminal 100, therefore, the scaling-up of the Web page image is stopped at the end of the operation of drawing a circle clockwise on the first touch screen 104.

Similarly, after recognizing that the scale-down operation has been started, the CPU 120 continues to change the scaling factor of the Web page image in accordance with the extent R(n) of motion curvature until the extent R(n) of motion curvature becomes more than (i.e., its absolute value becomes smaller than) a predetermined negative value (referred to also as a "scale-down end value").

In the portable terminal 100, therefore, the Web page image is continuously scaled down while the finger is continuously moved in a way of drawing a circle counterclockwise on the first touch screen 104.

The scale-down end value is set to be more than the scale-down start value (i.e., an absolute value of the former is set to be smaller than that of the latter). Accordingly, in the portable terminal 100, once the scale-down operation is recognized, a smaller absolute value of the extent R(n) of motion curvature is also recognized as representing the scale-down operation in comparison with the state before the recognition of the scale-down operation.

When the extent R(n) of motion curvature becomes more than the scale-down end value (i.e., when an absolute value of the former becomes smaller than that of the latter), the CPU 120 recognizes that the scale-down operation has been ended. Then, the CPU 120 stops the scaling-down of the Web page image and holds the scaling factor of the Web page image constant. In the portable terminal 100, therefore, the scaling-down of the Web page image is stopped at the end of the operation of drawing a circle counterclockwise on the first touch screen 104.

In the portable terminal 100, as described above, when the dragging is performed while drawing a circle on the first touch screen 104, the scroll operation and the scale-up/down operation are both recognized, whereupon the Web page image is scrolled and scaled up or down.

Here, it is assumed that the CPU 120 recognizes an operation of stopping the finger at one position for a predetermined time with the finger kept touched on the first touch screen 104 after the scale-up/down operation has been performed (such an operation being referred to also as a "long push operation after the scale-up/down operation"). In practice, at that time, if the amount of motion of the touch position per certain time is not larger than a predetermined value, the CPU 120 determines that the finger is substantially stopped at one position, even though the finger is not exactly stopped at one position.

In the above case, the CPU 120 recognizes that a gesture operation for selecting a position on the display screen corresponding to the current touch position (i.e., the position where the long push operation is made) by the user has been performed, and then executes processing that is set corresponding to the selected position. For example, when a link destination is set at a position on the Web page image in match with the current touch position, the CPU 120 recognizes that the link destination has been selected, and then accesses a page at the link destination via the radio communication unit 131.

Thus, in the portable terminal 100, operations of scrolling a Web page in an arbitrary direction, scaling up an image at an arbitrary position, and further selecting that position, for example, can be seamlessly executed with the user just performing the dragging once.

Be it noted that the first touch screen 104 and the CPU 120 in the portable terminal 100 represent hardware executing the function of the detection unit 2 in the information processing apparatus 1 described above in "Gist of Embodiment". Also, the CPU 120 in the portable terminal 100 represents hardware executing the functions of the recognition unit 3 and the control unit 4 in the information processing apparatus 1 described above in "Gist of Embodiment".

1-5. Processing Procedure for Gesture Operation Recognition

Figure 8:
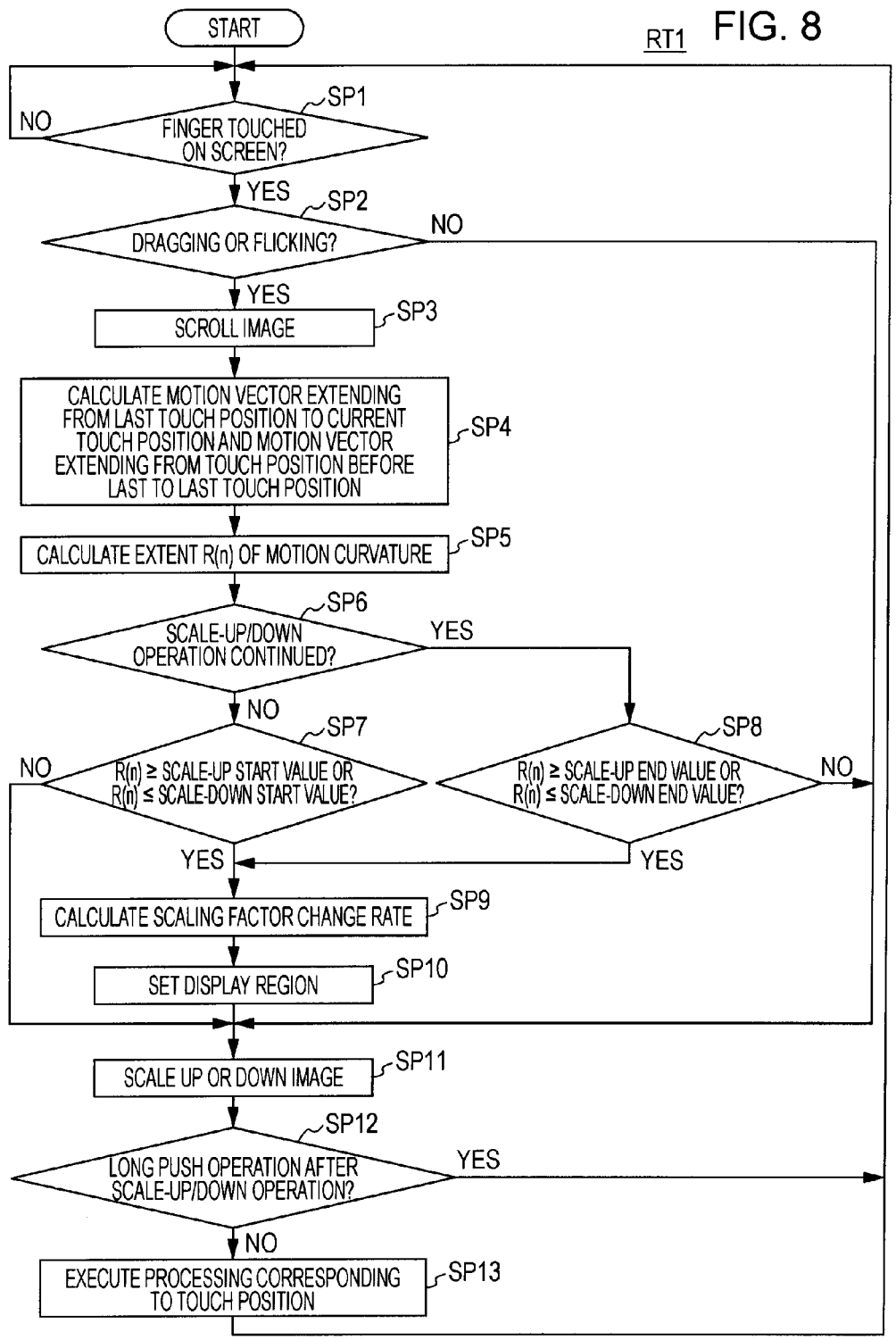
FIG. 8 is a flowchart illustrating a processing procedure for gesture operation recognition.

As described above, the portable terminal 100 recognizes the gesture operation, such as the scroll operation and the scale-up/down operation, made on the first touch screen 104. A processing procedure RT1 executed by the portable terminal 100 when recognizing the gesture operation made on the first touch screen 104 (referred to also as a "processing procedure RT1 for gesture operation recognition") will be described below with reference to FIG. 8.

The processing procedure RT1 for gesture operation recognition is a processing procedure that is executed by the CPU 120 in accordance with a program written in the ROM 121 or the storage unit 128.

After displaying the Web browser screen on the first touch screen 104, for example, the CPU 120 starts the processing procedure RT1 for gesture operation recognition and shifts to step SP1.

In step SP1, the CPU 120 determines, based on the input signal sent from the first touch screen 104, whether the finger is touched on the first touch screen 104.

If the determination result of "NO" is obtained in step SP1, the CPU 120 returns to step SP1 and waits for touching of the finger on the first touch screen 104.

On the other hand, if the determination result of "YES" is obtained in step SP1, this implies that an operation input has been made on the Web browser screen displayed on the first touch screen 104. In such a case, the CPU 120 shifts to next step SP2.

In step SP2, the CPU 120 derives screen coordinates of the touch position from the input signal sent from the first touch screen 104. Further, the CPU 120 determines, based on the amount of motion of the touch position per certain time, whether dragging or flicking has been performed on the first touch screen 104.

If the determination result of "YES" is obtained in step SP2, the CPU 120 recognizes that the scroll operation has been performed, and then shifts to next step SP3.

In step SP3, the CPU 120 scrolls the Web page image in accordance with the scroll operation, and then shifts to next step SP4.

In step SP4, the CPU 120 calculates the motion vector v1 extending from the one-cycle preceding touch position to the current touch position based on both the screen coordinate of the touch position obtained at this time and the screen coordinate of the touch position obtained at the last time. Further, the CPU 120 calculates the motion vector v2 extending from the two-cycle preceding touch position to the one-cycle preceding touch position based on both the screen coordinate of the touch position obtained at the last time and the screen coordinate of the touch position obtained before last. The CPU 120 then shifts to next step SP5.

In step SP5, the CPU 120 calculates the extent R(n) of motion curvature with the above-mentioned formulae (1) and (2) by using the motion vectors v1 and v2, and then shifts to next step SP6.

In step SP6, the CPU 120 determines whether the scale-up/down operation is currently being continued. The expression "the scale-up/down operation is currently being continued" implies a state where the end of the scale-up/down operation is not yet recognized after the start of the scale-up/down operation has been recognized based on the extent R(n) of motion curvature obtained up to the last time.

If the scale-up/down operation is not currently being continued and the determination result of "NO" is obtained in step SP6, the CPU 120 shifts to next step SP7.

In step SP7, the CPU 120 determines whether the extent R(n) of motion curvature is not less than the scale-up start value or not more than the scale-down start value.

If the determination result of "YES" is obtained in step SP7, the CPU 120 recognizes that the scale-up/down operation has been started, and then shifts to next step SP9.

On the other hand, if the scale-up/down operation is currently being continued and the determination result of "YES" is obtained in step SP6, the CPU 120 shifts to next step SP8.

In step SP8, the CPU 120 determines whether the extent R(n) of motion curvature is not less than the scale-up end value or not more than the scale-down end value.

If the determination result of "YES" is obtained in step SP8, the CPU 120 recognizes that the scale-up/down operation is being continued, and then shifts to next step SP9.

In step SP9, the CPU 120 calculates the scaling factor change rate ΔS with the above-mentioned formula (3) by using the extent R(n) of motion curvature, and then shifts to next step SP10.

In step SP10, the CPU 120 sets a display region in the scaled-up/down Web page image to scale up or down the Web page image with the current touch position being a center. The term "display region" implies a region of the Web page image, which is displayed on the first touch screen 104.

Figure 9:
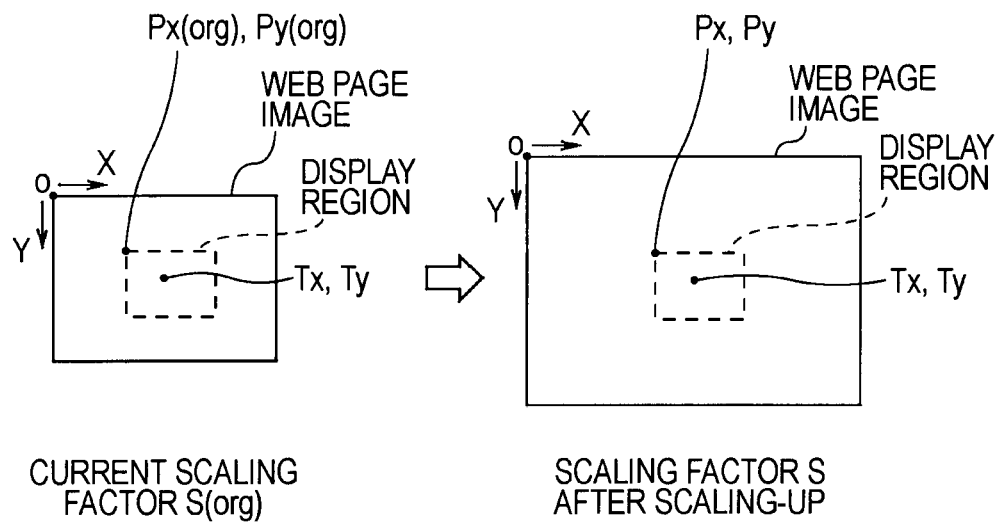
FIG. 9 is an illustration to explain setting of a display region.

More specifically, the CPU 120 sets the display region by calculating coordinates Px and Py representing, e.g., a position at an upper left corner of the display region (referred to also as "display region coordinates Px and Py"). For example, the display region coordinates Px and Py are represented, as illustrated in FIG. 9, as coordinates on an X-Y plane on condition that an upper left corner of the Web page image is the origin, an axis extending in the left-and-right direction is an X axis, and an axis extending in the up-and-down direction is a Y axis.

Assume here that the current display region coordinates are Px(org) and Py(org), the display region coordinates Px and Py in the Web page image scaled up or down with the current touch position being a center are expressed by the following formulae (4) and (5).

In the following formulae (4) and (5), the coordinates representing the current touch position are assumed to be Tx and Ty. It is also assumed that Tx and Ty are indicated as coordinates on an X-Y plane on condition that an upper left corner of the display screen of the first touch screen 104 (i.e., an upper left corner of the display region) is the origin, an axis extending in the left-and-right direction is an X axis, and an axis extending in the up-and-down direction is a Y axis. Further, it is assumed in the following formulae (4) and (5) that a current scaling factor of the Web page image is S(org) and a value resulting from adding the scaling factor change rate ΔS to S(org) is a new scaling factor S.

$$Px = (Px(Org) + Tx) \times \frac{S}{S(Org)} - Tx \quad (4)$$

$$Py = (Py(Org) + Ty) \times \frac{S}{S(Org)} - Ty \quad (5)$$

The CPU 120 calculates, with the formulae (4) and (5), the display region coordinates Px and Py in the Web page image when the image is scaled up or down with the current touch position being a center. After setting the display region in the Web page image when the image is scaled up or down with the current touch position being a center, as described above, the CPU 120 shifts to next step SP11.

In step SP11, the CPU 120 aligns the position of the display region with the calculated display region coordinates Px and Py on the Web page image that has been scaled up or down at the new scaling factor S. The CPU 120 scales up or down the Web page image in such a manner with the current touch position being a center, and then shifts to a next step SP12.

Meanwhile, if the extent R(n) of motion curvature is less than the scale-up start value and more than the scale-down start value and the determination result of "NO" is obtained in step SP7, this implies that the scale-up/down operation is not performed. In such a case, the CPU 120 shifts to next step SP12 without executing steps SP9 to SP11.

Also, if the extent R(n) of motion curvature is less than the scale-up end value and more than the scale-down end value and the determination result of "NO" is obtained in step SP8, this implies that the scale-up/down operation is not performed. In such a case, the CPU 120 recognizes that the scale-up/down operation has been ended, and then shifts to next step SP12 without executing steps SP9 to SP11.

If the determination result of "NO" is obtained in step SP2, this implies that the scroll operation and the scale-up/down operation are not performed. In such a case, the CPU 120 shifts to next step SP12 without executing steps SP3 to SP11.

In step SP12, the CPU 120 determines, based on the obtained screen coordinate of the touch position, whether the long push operation after the scale-up/down operation has been performed.

If the determination result of "YES" is obtained in step SP12, the CPU 120 shifts to next step SP13.

In step SP13, the CPU 120 recognizes that a position on the display screen in match with the current touch position has been selected by the user. Accordingly, the CPU 120 executes processing that is set corresponding to the current touch position on the display screen, and then returns to step SP1.

On the other hand, if the determination result of "NO" is obtained in step SP12, the CPU 120 returns to step SP1 without executing step SP13.

According to the above-described processing procedure RT1 for gesture operation recognition, the CPU 120 recognizes the gesture operation made on the first touch screen 104. Until the display of the Web browser screen is turned off, the CPU 120 continues to execute the processing procedure RT1 for gesture operation recognition.

1-6. Working Operations and Advantages

With the configuration described above, upon execution of the Web browser program, the portable terminal 100 displays, on the first touch screen 104, the Web browser screen to display the Web page image.

Now, when the touch operation is performed on the first touch screen 104, the portable terminal 100 recognizes the touch operation as the operation input made on the Web browser screen, i.e., on the display screen, and detects the amount of motion of the touch position and the extent R(n) of motion curvature per predetermined time.

The portable terminal 100 recognizes, based on the detected amount of motion, whether the scroll operation has been performed, and further recognizes, based on the detected extent R(n) of motion curvature, whether the scale-up/down operation has been performed.

When the portable terminal 100 recognizes that only the scroll operation has been performed, it executes processing just to scroll the Web page image in accordance with the detected amount of motion of the touch position.

On the other hand, when the portable terminal 100 recognizes that both the scroll operation and the scale-up/down operation have been performed, it executes not only the scrolling of the Web page image, but also the scaling-up or -down of the Web page image. At that time, the portable terminal 100 scrolls the Web page image in accordance with the detected amount of motion of the touch position and scales up or down the Web page image in accordance with the detected extent R(n) of motion curvature.

Thus, the portable terminal 100 can execute, in response to one operation input, only the scrolling of the Web page image and both the scrolling of the Web page image and the scaling-up or -down of the Web page image.

Further, since the scroll operation and the scale-up/down operation can be both realized with the touch operation using one finger, the portable terminal 100 does not necessitate a touch screen adapted for multi-touching. In addition, the portable terminal 100 does not necessitate a hardware key for executing the scale-up/down operation.

Accordingly, the configuration of the portable terminal 100 can be simplified in comparison with the case of employing the touch screen adapted for multi-touching or the hardware key for executing the scale-up/down operation.

In the portable terminal 100, a value of the extent R(n) of motion curvature detected at the last time is also taken into account when the extent R(n) of motion curvature is detected per predetermined time.

Therefore, even when the user draws, e.g., a distorted circle and the locus of the touch position temporarily comes close to a linear line, the portable terminal 100 can recognize the scale-up/down operation when a circle is substantially drawn in view of entirety.

In addition, while the finger is kept touched on the first touch screen 104, the portable terminal 100 continues to detect the extent R(n) of motion curvature per predetermined time and to scale up or down the Web page image in accordance with the detected extent R(n) of motion curvature.

Therefore, while the finger is continuously moved in a way of drawing a circle on the first touch screen 104, the portable terminal 100 can continue to scale up or down the Web page image. Accordingly, in the portable terminal 100, the scale-up factor or the scale-down factor of the Web page image can be finely adjusted by the user adjusting the number of times of drawing a circle on the first touch screen 104.

With the configuration described above, upon detecting the operation input made on the display screen, the portable terminal 100 recognizes a plurality of gesture operations (such as the scroll operation and the scale-up/down operation) from the detected operation input, and executes plural types of processing corresponding to the recognized plural gesture operations.

As a result, the portable terminal 100 can execute, in response to one operation input, plural types of processing, such as the scrolling of the Web page image and the scaling-up or -down of the Web page image.

2. Other Embodiments

Another Embodiment 1

In the embodiment described above, the CPU 120 calculates the current extent R(n) of motion curvature based on both the motion direction change f(v1,v2) and the preceding extent R(n−1) of motion curvature.

However, embodiments are not limited to the above-described one. When the current extent R(n) of motion curvature is calculated, the CPU 120 may take into account the size of the motion vector in addition to the motion direction change f(v1,v2) and the preceding extent R(n−1) of motion curvature.

In such a case, as expressed in the following condition formula (6), the CPU 120 rounds the motion direction change f(v1,v2), which has been calculated by using the above-mentioned formula (1), to "0" if a value of |v1|·|v2| resulting from multiplying the size of the motion vector r1 by the size of the motion vector r2 is not smaller than a predetermined value D:

$$f(v1,v2)=f(v1,v2) \ (|v1|\cdot|v2|<D)$$

$$f(v1,v2)=0 \ (|v1|\cdot|v2|\geq D) \quad (6)$$

From the motion direction change f(v1,v2) thus calculated, the CPU 120 calculates the extent R(n) of motion curvature by using the above-mentioned formula (2).

The predetermined value D is set to such a value as enabling discrimination to be made between the case that a small circle (e.g., a circle having a size falling within the display screen) is drawn on the display screen by the dragging and the case that a large circle (e.g., a circle having a size not falling within the display screen) is drawn on the display screen. With that setting, the portable terminal 100 can recognize the scale-up/down operation when the small circle is drawn, but it does not recognize the scale-up/down operation when the large circle is drawn. In the portable terminal 100, therefore, even if the dragging is somewhat curved and a circular arc is drawn when the user is going to perform only the scroll operation, for example, the scale-up/down operation is not recognized.

The predetermined value D may be changed to a larger value after the scale-up/down operation has been started than that before the scale-up/down operation has been started. With such a modification, after the scale-up/down operation has been started, the portable terminal 100 recognizes the scale-up/down operation even when the amount of motion of the finger is comparatively larger than that before the scale-up/down operation has been started.

Alternatively, the CPU 120 may be designed so as not to recognize the scale-up/down operation when the size of the motion vector is not smaller than a predetermined value, i.e., when the amount of motion of the finger per certain time is not less than a predetermined value.

2-2. Still Another Embodiment 2

In the embodiment described above, when the scale-up/down operation is continuously performed, the CPU 120 continuously scales up or down the Web page image.

However, embodiments are not limited to the above-described one. When the scaling factor of the Web page image reaches a predetermined value, the CPU 120 may temporarily hold the scaling factor of the Web page image fixed instead of continuously scaling up or down the Web page image.

More specifically, when the CPU 120 calculates the scaling factor change rate ΔS in accordance with the extent R(n) of motion curvature, the CPU 120 sets, as a temporary scaling factor Sk, a value resulting from adding the scaling factor change rate ΔS to the current scaling factor of the Web page image. Further, the CPU 120 obtains a final scaling factor S from the temporary scaling factor Sk and displays the Web page image in accordance with the final scaling factor S.

Figure 10:
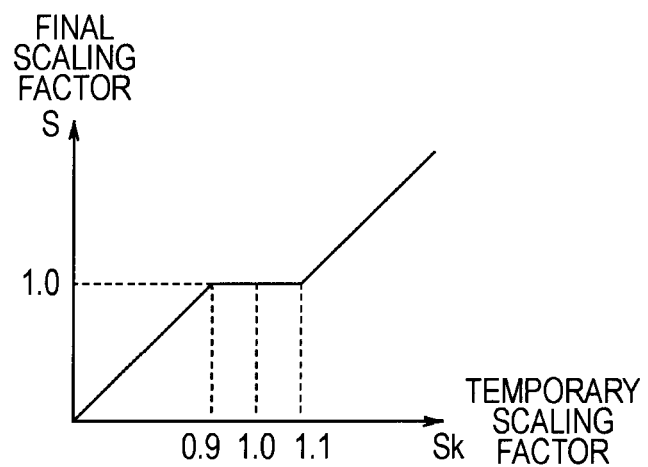
FIG. 10 is a graph to explain the relationship between a temporary scaling factor and a final scaling factor in another embodiment.

FIG. 10 is a graph illustrating the relationship between the temporary scaling factor Sk and the final scaling factor S. According to the illustrated graph, when the temporary scaling factor Sk is within the range from "0.9" to "1.1", for example, the final scaling factor S is fixedly set to "1".

Stated another way, even when the scale-up/down operation is continuously performed and the temporary scaling factor Sk is changed, the scaling factor of the Web page image is held fixed to 1, i.e., a reference scaling factor, if the temporary scaling factor Sk is within the range from "0.9" to "1.1".

In the portable terminal 100, therefore, when the scale-up/down operation is continuously performed by the user, the Web page image is continuously scaled up or down, but when the scaling factor of the Web page image reaches the reference scaling factor, it is temporarily fixed to the reference scaling factor.

Accordingly, when the scale-up/down operation is performed by the user, the portable terminal 100 can easily return the scaling factor of the Web page image to the reference scaling factor.

The temporarily fixed scaling factor of the Web page image is not limited to the reference scaling factor (i.e., ×1), and it may be one of other various scaling factors. For example, when a predetermined block is set in the image, the scaling factor may be set such that the relevant block is displayed just over the entire screen. As an alternative, the scaling factor may be set such that an image selected by, e.g., a cursor is displayed just over the entire screen.

2-3. Still Another Embodiment 3

In the embodiment described above, when the CPU 120 recognizes the scroll operation and the scale-up/down operation, the CPU 120 executes both the processing corresponding to the scroll operation and the processing corresponding to the scale-up/down operation.

However, embodiments are not limited to the above-described one. When the CPU 120 recognizes the scroll operation and the scale-up/down operation, it may execute the processing corresponding to one of the scroll operation and the scale-up/down operation.

For example, when the CPU 120 recognizes the scroll operation and the scale-up/down operation, it may execute scaling-up or -down of the Web page image corresponding to the scale-up/down operation without scrolling the Web page image corresponding to the scroll operation.

In such a case, when the CPU 120 detects the dragging performed on the first touch screen 104, it recognizes the scroll operation and further determines whether the scale-up/down operation is performed.

When the CPU 120 recognizes only the scroll operation, it executes the scrolling of the Web page image. When the CPU 120 recognizes the scroll operation and the scale-up/down operation, it executes the scaling-up or -down of the Web page image.

As a result, the portable terminal 100 can separately execute the scrolling of the Web page image and the scaling-up or -down of the Web page image.

Moreover, the portable terminal 100 can seamlessly execute the operations of scrolling the Web page in an arbitrary direction and scaling up or down the Web page image at an arbitrary position with the user performing only one drag operation.

Stated another way, when a plurality of gesture operations (such as the scroll operation and the scale-up/down operation) are recognized from the operation input made on the display screen, it is necessary for the portable terminal 100 to execute at least one of plural types of processing corresponding to the plurality of gesture operations.

Accordingly, the portable terminal 100 is adaptable for not only an operating system that executes plural types of processing in response to one operation input as in the above-described embodiment, but also an operating system that executes one type of processing in response to one operation input as in Still Another Embodiment 3. Hence, the portable terminal 100 can realize a more versatile operating system.

2-4. Still Another Embodiment 4

In the embodiment described above, when the CPU 120 recognizes the scroll operation and the scale-up/down operation, the CPU 120 executes both the scrolling of the Web page image and the scaling-up or -down of the Web page image.

However, embodiments are not limited to the above-described one. The CPU 120 may selectively execute both the scrolling of the Web page image and the scaling-up or -down of the Web page image, or only the scaling-up or -down of the Web page image depending on the size of a circle drawn in the scale-up/down operation.

In such a case, the CPU 120 derives the screen coordinates of three touch positions from the input signals successively sent from the first touch screen 104 per certain time, and determines whether those three touch positions locate on a straight line. If the three touch positions do not locate on a straight line, the CPU 120 detects the radius of a circle passing the three touch positions, thereby detecting the radius of a circle that is drawn by the dragging made on the display screen.

If the detected radius of the circle is smaller than a predetermined value, the CPU 120 executes both the scrolling of the Web page image and the scaling-up or -down of the Web page image. On the other hand, if the detected radius of the circle is not smaller than the predetermined value, the CPU 120 executes only the scaling-up or -down of the Web page image. As the distance through which the touch position is moved increases, the detected radius of the circle increases and the distance through which the Web page image is scrolled also increases. Therefore, the predetermined value is set to such a value as not making the Web page image hard to view when both the scrolling of the Web page image and the scaling-up or -down of the Web page image are performed.

Thus, when the CPU 120 recognizes that both the scroll operation and the scale-up/down operation have been performed, it executes only the scaling-up or -down of the Web page image without scrolling the Web page image if the detected radius of the circle is not smaller than the predetermined value.

As a result, the CPU 120 can prevent the Web page image from being scrolled overly and hence can prevent the Web page image from becoming hard to view.

In addition, when the CPU 120 recognizes that both the scroll operation and the scale-up/down operation have been performed, it executes both the scrolling of the Web page image and the scaling-up or -down of the Web page image if the detected radius of the circle is smaller than the predetermined value.

As a result, the CPU 120 can execute both the scrolling of the Web page image and the scaling-up or -down of the Web page image in response to one drag operation when the Web page image does not become hard to view with the scrolling of the Web page image.

Alternatively, when the CPU 120 recognizes the scroll operation and the scale-up/down operation, it may execute both the scrolling of the Web page image and the scaling-up or -down of the Web page image if the distance of motion of the touch position per certain time is small. On the other hand, when the CPU 120 recognizes the scroll operation and the scale-up/down operation, it may execute only the scaling-up or -down of the Web page image if the distance of motion of the touch position per certain time is large.

2-5. Still Another Embodiment 5

In the embodiment described above, the CPU 120 displays, on the first touch screen 104, the Web browser screen to display the Web page image.

However, embodiments are not limited to the above-described one. The CPU 120 may display the Web browser screen on both the first touch screen 104 and the second touch screen 105 in a divided manner.

In such a case, when the scale-up/down operation is performed on the second touch screen 105, for example, the CPU 120 may scale up or down only a portion of the Web page image, which is displayed on the second touch screen 105.

Stated another way, when the Web page image is displayed in a manner divided into a plurality of display screens, the CPU 120 may scale up or down only a portion of the Web page image displayed on the display screen on which the scale-up/down operation has been performed.

As a result, the portable terminal 100 enables the user to confirm the Web page images at a plurality of different scaling factors.

Alternatively, when the scale-up/down operation is performed on the first touch screen 104, for example, the CPU 120 may scale up or down the entirety of the Web page image that is displayed on the first touch screen 104 and the second touch screen 105.

2-6. Still Another Embodiment 6

In the embodiment described above, the CPU 120 brings the scaling-up or -down of the Web page image to an end when the extent R(n) of motion curvature has become not more than the scale-up end value or not less than the scale-down end value while the scale-up/down operation is being continued.

However, embodiments are not limited to the above-described one. The CPU 120 may bring the scaling-up or -down of the Web page image to an end when a change rate of the extent R(n) of motion curvature (i.e., a gradient of R(n) illustrated in the graph of FIG. 6) has become not more than a predetermined value while the scale-up/down operation is being continued.

Alternatively, the CPU 120 may bring the scaling-up or -down of the Web page image to an end in accordance with both the value of the extent R(n) of motion curvature and the change rate of the extent R(n) of motion curvature.

2-7. Still Another Embodiment 7

In the embodiment described above, the first touch screen 104 and the second touch screen 105 send the input signals per certain time to the CPU 120.

However, embodiments are not limited to the above-described one. The first touch screen 104 and the second touch screen 105 may irregularly send the input signals to the CPU 120. In such a case, the CPU 120 may calculate a motion vector so as to represent the amount and the direction of motion of the touch position per certain time based on the screen coordinate of the touch position, which has been derived from the input signal, and on the time at which the relevant input signal has been obtained.

2-8. Still Another Embodiment 8

In the embodiment described above, when the scale-up/down operation is performed, the CPU 120 scales up or down the Web page image with the current touch position being a center.

However, embodiments are not limited to the above-described one. When the scale-up/down operation is performed, the CPU 120 may estimate a center of a circle drawn in the scale-up/down operation and may set the estimated center as a center about which the Web page image is scaled up or down. In such a case, the CPU 120 estimates the center of the circle drawn in the scale-up/down operation, for example, by obtaining arbitrary three points from the locus of the touch position during the scale-up/down operation, and by determining a circle passing those three touch positions.

2-9. Still Another Embodiment 9

In the embodiment described above, the CPU 120 recognizes the scroll operation and the scale-up/down operation from the operation input made on the display screen, and then executes the processing corresponding to the recognized gesture operations.

However, embodiments are not limited to the above-described one. So long as the CPU 120 recognizes at least one or more gesture operations from the operation input made on the display screen, the CPU 120 may additionally recognize other various gesture operations and may execute processing corresponding to the recognized gesture operations.

For example, the CPU 120 detects the amount of motion and the extent of motion curvature per predetermined time for the operation input made on the display screen. On that occasion, the CPU 120 may not only recognize the scroll operation based on the amount of motion, but also recognize other gesture operations corresponding to adjustment of brightness of the display screen or a sound level and rotation of the display screen, for example, based on the extent of motion curvature.

Moreover, in the embodiment described above, when the scroll operation and/or the scale-up/down operation is performed on the first touch screen 104, the CPU 120 scrolls and/or scales up/down the Web page image displayed on the first touch screen 104.

However, embodiments are not limited to the above-described one. The CPU 120 may display other various images on the first touch screen 104, and may scroll and/or scale up/down the displayed image in accordance with the scroll operation and/or the scale-up/down operation. As an alternative, the CPU 120 may scroll and/or scale up/down an image displayed on the second touch screen 105 in accordance with the scroll operation and/or the scale-up/down operation performed on the second touch screen 105.

2-10. Still Another Embodiment 10

In the embodiment described above, the first touch screen 104 which serves as the detection unit 2, and the CPU 120 which serves as the detection unit 2, as the recognition unit 3, and as the control unit 4 are disposed in the portable terminal 100 that is an example of the information processing apparatus 1.

However, embodiments are not limited to the above-described one. So long as the portable terminal 100 has the same functions, the above-described units of the portable terminal 100 may be constituted by using other various suitable hardware or software components.

For example, the detection unit is not limited to the first touch screen 104, and another unit, such as a mouse, an analog stick, or a stereo sensor for recognizing a gesture of the user, may also be used so long as it has the function of detecting the operation input made on the display screen.

While the touch screen made up of the liquid crystal panel and the touch panel is disposed in the above-described embodiment, a liquid crystal display with the touch panel function may be disposed instead. While the first touch screen 104 and the second touch screen 105 are disposed in the portable terminal 100, the screen layout is not limited to the above-described embodiment and only one display screen or three or more display screens may be disposed instead.

In the embodiment described above, the present invention is applied to the portable terminal 100. However, application forms are not limited to the portable terminal. The present invention may be or can be applied to other various types of information processing apparatuses, e.g., a cellular phone and a PDA (Personal Digital Assistant), so long as an operation input on a display screen is detected in the information processing apparatus.

2-11. Still Another Embodiment 11

In the embodiment described above, the programs for executing various types of processing are written in the ROM 121 or the storage unit 128 of the portable terminal 100.

However, embodiments are not limited to the above-described one. Those programs may be recorded on a storage medium, such as a memory card, and the CPU 120 in the portable terminal 100 may read the programs from the storage medium and execute them. Further, a flash memory may be disposed instead of the ROM 121, and the programs read from the storage medium may be installed in the flash memory.

2-12. Still Another Embodiment 12

The present invention is not limited to the above-described embodiment and other embodiments. In other words, the present invention can also be practiced in forms combining the above-described embodiment with part or all of one or more of the other embodiments, or in forms partly extracted from the above-described embodiment and other embodiments. For example, Another Embodiment 1 and Still Another Embodiment 2 may be combined with each other.

It should be understood by those skilled in the art that various modifications, combinations, sub-combinations and alterations may occur depending on design requirements and other factors insofar as they are within the scope of the appended claims or the equivalents thereof.

What is claimed is:

1. Apparatus for controlling a display screen, comprising:
a touch-sensitive panel generating position signals representing a set of positions of a single continuous touch activation between a first time and a second time, wherein the single continuous touch activation comprises a change of direction; and
a processor coupled to the panel, the processor configured to:
process the signals to detect first and second characteristics of the set, wherein the first characteristic is based on the direction of the single continuous touch activation before the change of direction and the second characteristic is based on the direction of the single continuous touch activation after the change of direction; and
generate output signals causing a display screen to initiate first and second operations corresponding to the first and second characteristics based on the single continuous touch activation,
wherein the first operation comprises a scrolling operation, and
wherein the second operation comprises a scaling operation performed in conjunction with the scrolling operation.

2. The apparatus of claim 1, wherein the first characteristic comprises a distance between a position at the first time and a position at the second time.

3. The apparatus of claim 2, wherein the processor is further configured to:
compare the distance to a predetermined value; and
determine whether to initiate the first operation based on the comparison.

4. The apparatus of claim 2, wherein the processor is further configured to:
determine a speed of the activation across the distance; and
determine whether to initiate the first operation based on the speed.

5. The apparatus of claim 1, wherein the second characteristic comprises a curvature between a position at the first time and a position at the second time.

6. The apparatus of claim 5, wherein:
when the curvature is clockwise, the second operation comprises a scale-up operation; and
when the curvature is counterclockwise, the second operation comprises a scale-down operation.

7. The apparatus of claim 5, wherein the second operation comprises a scaling operation focused at a center of the curvature.

8. The apparatus of claim 5, wherein the processor is further configured to calculate the curvature based on a change in direction between a motion vector at the first time and a motion vector at the second time.

9. The apparatus of claim 8, wherein the second characteristic further comprises a size of the motion vector at the first time and a size of the motion vector at the second time.

10. The apparatus of claim 1, wherein the processor is further configured to:
determine a scaling factor; and
pause the scaling operation upon reaching a predetermined value of the scaling factor.

11. The apparatus of claim 1, wherein:
the display screen comprises a first display screen of the apparatus; and
the apparatus further comprises a second display screen.

12. The apparatus of claim 11, wherein the first display comprises the touch-sensitive panel.

13. The apparatus of claim 11, wherein the second display comprises the touch-sensitive panel.

14. A method for controlling a display screen, comprising:
detecting a set of positions of a single continuous touch activation on a touch panel from a first time to a second time, wherein the single continuous touch activation comprises a change of direction;
initiating a first operation on a display screen based on a first characteristic of the set; and
initiating a second operation on the display screen based on a second characteristic of the set, wherein both the first operation and the second operation are based on the single continuous touch activation,
wherein the first characteristic is based on the direction of the single continuous touch activation before the change of direction and the second characteristic is based on the direction of the single continuous touch activation after the change of direction, wherein the first operation comprises a scrolling operation, and wherein the second operation comprises a scaling operation performed in conjunction with the scrolling operation.

15. The method of claim 14, wherein initiating the first and second operations comprises initiating the first and second operations sequentially.

16. The method of claim 14, wherein initiating the first and second operations comprises initiating the first and second operations simultaneously.

17. The method of claim 14, wherein detecting the set of positions comprises detecting the set of positions on a touch panel coincident with the display screen.

18. The method of claim 14, wherein detecting the set of positions comprises detecting the set of positions on a touch screen not coincident with the display screen.

19. A non-transitory computer-readable medium storing a set of instructions that, when executed by a processor, perform a method, the method comprising:

detecting a set of positions of a single continuous touch activation on a touch panel from a first time to a second time, wherein the single continuous touch activation comprises a change of direction;

initiating a first operation on a display screen based on a first characteristic of the set; and initiating a second operation on the display screen based on a second characteristic of the set, wherein both the first operation and the second operation are based on the single continuous touch activation, wherein the first characteristic is based on the direction of the single continuous touch activation before the change of direction and the second characteristic is based on the direction of the single continuous touch activation after the change of direction, wherein the first operation comprises a scrolling operation, and wherein the second operation comprises a scaling operation performed in conjunction with the scrolling operation.

* * * * *